2 Sheets—Sheet 1.
S. GOLAY.
Machine for Dressing Millstones.
No. 3,318. Reissued March 2, 1869.
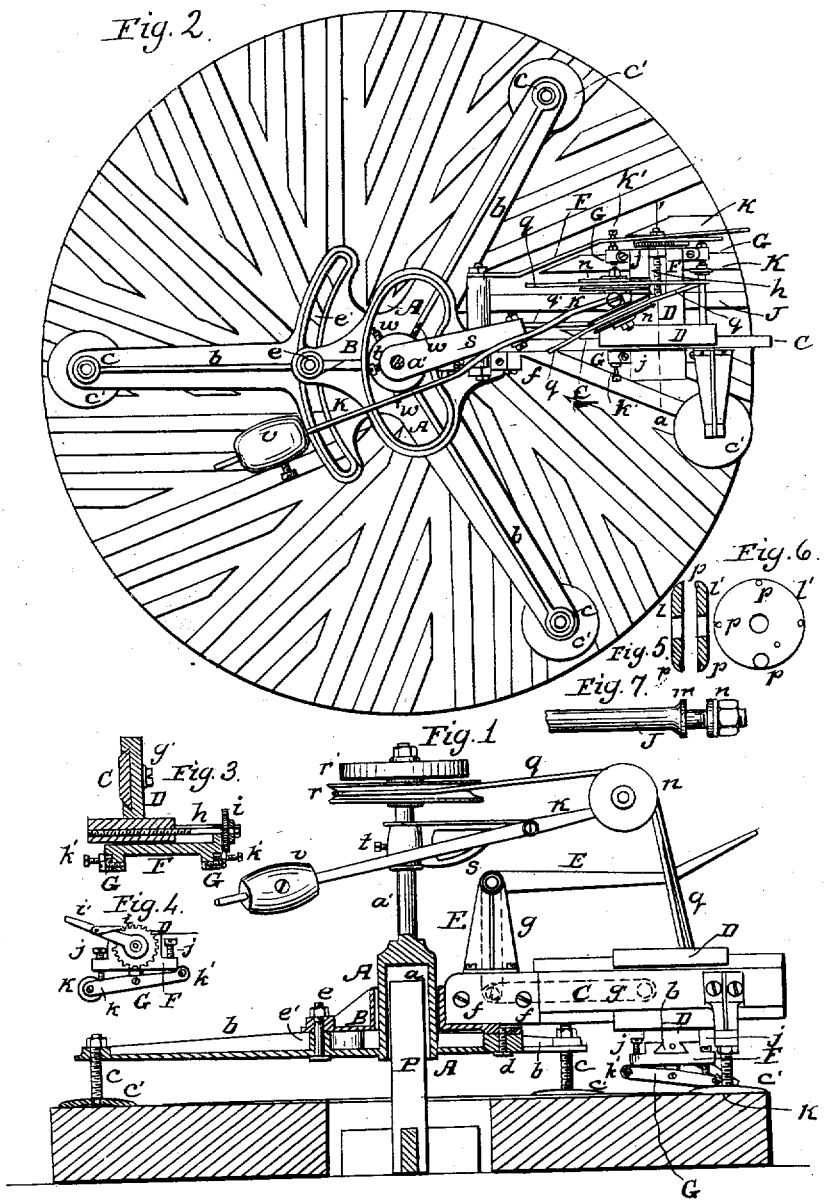
Witnesses:
Wm. Albert Stall
Wm. Adams
Inventor.
S. Golay
By his Atty.
H. Howson
N. PETERS, Photo-Lithographer, Washington, D. C.

2 Sheets—Sheet 2.

S. GOLAY.

Machine for Dressing Millstones.

No. 3,318.

Reissued March 2, 1869.

Witnesses:
Wm. Attel
John Parker.

Inventor:
S. B. Lean
By his Atty
H. Howson

N. PETERS, Photo-Lithographer, Washington, D. C.

UNITED STATES PATENT OFFICE.

HENRY B. SEARS, OF LIVERPOOL, ENGLAND, ASSIGNEE OF SAMUEL GOLAY.

IMPROVED MACHINE FOR DRESSING MILLSTONES.

Specification forming part of Letters Patent No. 73,524, dated January 21, 1868; Reissue No. 3,318, dated March 2, 1869.

*To all whom it may concern:*

Be it known that I, H. B. SEARS, of Liverpool, England, am the owner of certain Letters Patent for Dressing Millstones, granted to SAMUEL GOLAY on the 21st day of January, 1868; and I do hereby declare the following to be a full, clear, and exact description of the same.

The main feature of the said invention consists of a cutting-tool armed with diamond, "bort," or other hard stone, and constructed and operating as fully described hereinafter, so as to cut grooves in the surface of a millstone or other stone by a series of blows delivered in quick succession and having a chipping-action.

Other features of my invention consist of devices, fully described hereinafter, for facilitating the adjustment and operation of the tool.

In order to enable others skilled in the art to make and use the invention, I will now proceed to describe its construction and operation, reference being had to the accompanying drawings, which form a part of this specification, and in which—

Figure 8:
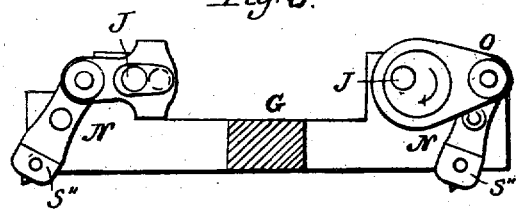
Figure 9:
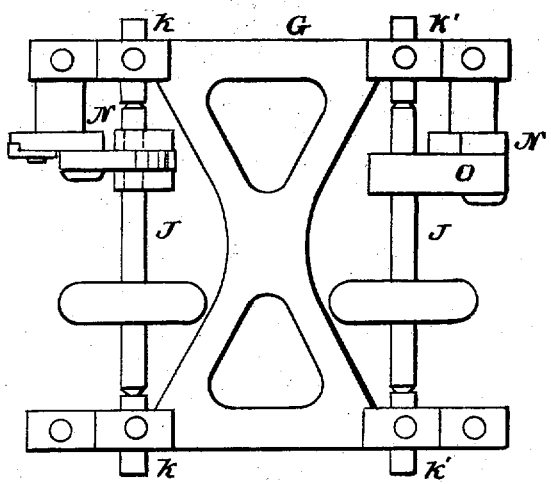

Figure 1, Sheet No. 1, is a side elevation, partly in section, of one form of machine, which may be used in carrying out the said invention; Fig. 2, a plan view of the same; Fig. 3, a transverse section of part of the machine on the line 1 2, Fig. 1; Fig. 4, an end view of Fig. 3; Figs. 5, 6, and 7, detached views of one form of cutting-tool; Figs. 8 and 9, Sheet No. 2, views illustrating the vibrating tool arranged upon a carriage.

The frame A of the machine consists of a central hub, in which is formed a socket, *a*, and from which projects a vertical standard, *a'*, and radial arms *b*, provided at their outer ends with set-screws *c*, the lower ends of the latter being adapted to recesses in plates *c'*, which rest upon the surface of the millstone to be dressed, as fully described hereinafter. A frame, B, is pivoted to the frame A by a set-screw or bolt, *d*, and may be adjusted laterally on the same and secured after adjustment by means of a bolt, *e*, which passes through a slot, *e'*, in the frame A, the said slot being in the arc of a circle of which the bolt *d* is the center. A guide-bar, C, which in the present instance is dovetailed, is secured to the frame B by bolts or screws *f*, which pass through slots in the frame, so that the bar (although it generally occupies the horizontal position shown in Fig. 1) may be readily adjusted to an inclined position, for a purpose described hereinafter.

The bar C carries a slide, D, and this slide carries an adjustable plate, F, the movement of which is at right angles to that of the slide D, and a reciprocating motion on the guide-bar C may be imparted to the slide by a bell-crank lever, E, hung to a standard, *g*, and connected to the slide by a link, *g'*. The sliding plate F in the present instance is operated by a screw-rod, *h*, ratchet-wheel *i*, and lever and pawl *i'*, as shown in Figs. 3 and 4. At the outer end of the guide-arm C is a bracket, in which turns an elevating-screw, $c^2$, having at the lower end a plate, *c'*, and which supports the arm at its outer end, so as to prevent it from vibrating or altering its position during the movement of the slide. Two levers forming a carriage, G, Fig. 1, are hung to the under side of the sliding plate F, and are secured in the desired position by means of adjusting-screws *j*, which pass through projections on the plate and bear on the levers or carriage, one on each side of the axis on which the carriage vibrates. A spindle, J, rotates on the points of screws *k* at one end of the carriage, but can be readily removed from the screws and adjusted to the points of screws *k'* at the opposite end of the carriage.

The operating-shaft is caused to revolve by a band, *q*, passing from a pulley, *r*, which turns upon the standard *a'* of the frame A, and to which motion is communicated by a band passing from a pulley on any adjacent shaft and round a pulley, *r'*.

An adjustable arm, *s*, is secured to the standard *a'* by a set-screw, *t*, Fig. 1, and at the other end of this arm is hung a lever, K, which can oscillate freely upon the arm, and has at one end two pulleys, *n n*, over which the band *q* passes, and at the other end a counterpoise, *v*, which tends to elevate the pulleys and keep the band tight without preventing it from extending and contracting as the slide is moved.

The cutting-tool may consist of a disk secured to the shaft J, and armed at the periphery with cutting-points of diamond or bort, this tool in the present instance consisting of two plates, *l l'*, each having a recess, (or recesses of different sizes,) which, when the plates are brought together, forms a socket for the reception of a diamond, the latter being clamped between the plates with its cutting-point projecting beyond the peripheries of the same.

Although the above-described rotating tool may be used, I do not claim it. The peculiar feature which I desire to claim as the invention of the said GOLAY is a vibrating or picking tool, and this may be caused to act by the devices which I will now proceed to describe, reference being had to Figs. 8 and 9.

An arm, N, is hung to a stud on the carriage G, and is armed at the lower end with a diamond or other hard stone, and jointed at the upper end to a rod, O, fitted to a crank or eccentric on the shaft J. The diamond is fitted to a socket formed partly in the arm and partly in a plate, *s''*, bolted to the arm in a manner substantially as described, on reference to Figs. 5 and 6, Sheet No. 1.

Operation: The machine is first placed upon a perfectly level surface, (generally at the place where the apparatus is manufactured,) the set-screws *c* resting upon or secured to the plates *c'*, after which (by turning the screws *c*) the machine is brought to a perfectly level position. After being thus adjusted the machine is ready to be placed upon the millstone to be dressed, the screws *c* still resting upon the plates *c'*. This preliminary adjustment of the machine before placing it upon the stone is most important, inasmuch as after it has once been perfectly adjusted on a level surface its further adjustment on the stone will not be required, and the operator, however inexperienced, cannot fail to reduce the stone to a true plane by merely causing the tool to traverse its surface. A vertical spindle or shaft, P, is fitted to the eye of the stone, and projects into the socket *a* of the frame of the machine, and the latter, if necessary, is properly centered by its set-screw *w*, Fig. 2. Motion is communicated to the pulleys *r* and *r'*, and thence by the band *q* to the spindle J. As the spindle revolves, a rapid vibrating motion will be imparted to the tool, and the cutting-point of the latter will be caused to strike the stone a rapid succession of blows, detaching portions of the same with a chipping action, and, as the carriage slides on the arm, forming a groove or "crack," the blows, as the arm vibrates in one direction, being from the face of the stone downward to the bottom of the groove, and on the reverse movement of the arm from the bottom of the groove upward to the face of the stone.

As soon as a groove of the desired length has been made in the stone, the carriage is drawn back to its first position, and the sliding plate F is moved laterally to a slight extent, and the slide is again moved forward and a second groove formed, the slide F being then again adjusted and the operation repeated.

It will be seen, on reference to Fig. 2, that the dress of the stone consists of a number of divisions, each having three parallel channels or furrows communicating with the main furrow of the next division. After dressing the first "land," (or space between the furrows,) as before described, the operation is repeated upon the next parallel land of the same division until the sliding plate F has reached the end of its course. The machine is then turned and the guide-bar C brought parallel with another channel by adjusting the frame B, after which the face of the land is dressed, as before described, these operations being repeated until the entire face of the stone is dressed.

When it is desired to operate upon the central portion of the stone, the bolts *f* are loosened, and the guide-bar C slightly inclined, as before described, after which the spindle J is mounted upon the screws *k'*, the arm N is transferred to this end of the carriage, and the operations continued as before.

The adjustable frame B is an important feature of the invention, for without it a much longer movement of the sliding plate F and a more frequent adjustment of the frame A would be necessary, in order to adjust the tool to the different positions required.

As some stones are furrowed to the right and others to the left, the machine is so constructed that the guide-bar C can be secured to either side of that portion of the frame B to which the bolts *f* attach it. In other words, it may be placed at either side of the center of the frame. The position of the slide may thus be reversed, so as to dress the lands parallel to the furrows, whatever may be the direction of the latter.

It will be seen that by extending the arms *b* nearly to the periphery of the stone, or outward as far as the end of the guide-bar, such a firm foundation is secured that the tremors or vibrations which take place when the points of support are near the center of the stone are prevented.

Although a rotating tool armed with diamonds has been described, the tool thus constructed is not claimed, broadly, as the invention of the said GOLAY; but it will be seen that the peculiar construction of the tool permits the ready withdrawal and replacing of the stones, and retains them firmly in the positions to which they are adjusted.

The vibrating or picking tool may be caused to make a greater number of blows in the same time, and will produce a smoother cut than one which rotates; and although one mode of imparting a vibrating motion to this tool has been described, various other means may be employed for effecting this purpose.

I do not claim, broadly, a cutting-tool armed with a diamond, as I am aware that such a tool was invented and patented in France in 1854 and 1855 by Georges Hermann; but

I claim as the invention of the said S. GOLAY and desire to secure by Reissued Letters Patent—

1. A tool armed with a diamond, to which a vibrating or picking motion is imparted, and arranged to traverse the face of a millstone, substantially as described.

2. A cutting-tool in which a diamond or diamonds are secured in recesses formed in two plates clamped together laterally, substantially as described.

3. A guide-bar, C, secured to the frame of the machine, in combination with an adjustable support, $c^2$, at the outer end, substantially as and for the purpose set forth.

4. A frame, B, carrying a guide-bar, C, and adjustable on a pin, *d*, on the frame of the machine, substantially as and for the purpose described.

5. The plates *c'*, in combination with the set-screws *c*, substantially as and for the purpose specified.

6. The detachable guide-bar C, secured to the frame of the machine and adjustable thereon, as set forth.

7. A carriage, G, hung to the slide D, and adapted for the reception of a cutting-tool at either end, substantially as specified.

In testimony whereof I have signed my name to this specification before two subscribing witnesses.

HENRY B. SEARS.

Witnesses:
CHARLES E. FOSTER,
WM. A. STEEL.